US009235927B2

(12) United States Patent
Mitev et al.

(10) Patent No.: US 9,235,927 B2
(45) Date of Patent: Jan. 12, 2016

(54) SHADING CG REPRESENTATIONS OF MATERIALS

(71) Applicant: Chaos Software Ltd., Sofia (BG)

(72) Inventors: Peter Ognyanov Mitev, Sofia (BG); Ivaylo Katev Iliev, Plovdiv (BG); Ivelin Yankov Yordanov, Kovatchitsa (BG)

(73) Assignee: Chaos Software Ltd., Sofia (BG)

( * ) Notice: Subject to any disclaimer, the term of this patent is extended or adjusted under 35 U.S.C. 154(b) by 0 days.

(21) Appl. No.: 14/659,160

(22) Filed: Mar. 16, 2015

(65) Prior Publication Data
US 2015/0332497 A1 Nov. 19, 2015

Related U.S. Application Data

(63) Continuation of application No. 14/278,025, filed on May 15, 2014, now Pat. No. 8,982,125.

(51) Int. Cl.
*G06T 15/50* (2011.01)
*G06T 15/80* (2011.01)
*H04N 7/18* (2006.01)

(52) U.S. Cl.
CPC . *G06T 15/80* (2013.01); *H04N 7/18* (2013.01)

(58) Field of Classification Search
None
See application file for complete search history.

(56) References Cited

U.S. PATENT DOCUMENTS

| 8,982,125 | B1 | 3/2015 | Mitev et al. | |
| 8,982,126 | B1 | 3/2015 | Mitev et al. | |
| 2004/0032649 | A1* | 2/2004 | Kondo et al. | 359/364 |
| 2004/0075047 | A1* | 4/2004 | Schnitzlein et al. | 250/234 |
| 2005/0180623 | A1 | 8/2005 | Mueller et al. | |
| 2008/0306709 | A1* | 12/2008 | Fisker et al. | 702/167 |
| 2009/0310852 | A1* | 12/2009 | Cheng et al. | 382/154 |
| 2013/0038696 | A1 | 2/2013 | Ding et al. | |
| 2013/0120385 | A1 | 5/2013 | Krishnaswamy et al. | |

FOREIGN PATENT DOCUMENTS

JP 2013-38775 2/2013

OTHER PUBLICATIONS

Office Action Received in Korean Patent Application No. 10-2015-0068259, filed May 15, 2015. Received Jul. 13, 2015. 9 pages.
Office Action Received in Canadian Patent Application No. 2,891,431 filed May 14, 2015. Received Jul. 14, 2015. 4 pages.

* cited by examiner

*Primary Examiner* — Kee M Tung
*Assistant Examiner* — Ryan D McCulley
(74) *Attorney, Agent, or Firm* — Fish & Richardson P.C.

(57) ABSTRACT

Methods, systems, and apparatus, including computer programs encoded on a computer storage medium, for shading computer graphics (CG) representations of materials. One of the methods includes obtaining data describing a physical material; receiving a shading request to shade a particular point in a CG representation of the physical material from a rendering engine, wherein the request identifies a mapping position of the particular point, a view direction at the mapping position, and a light direction at the mapping position; calculating a direct lighting color at the mapping position using a plurality of palletized images; calculating an indirect lighting color at the mapping position using the data describing the physical material; generating a final color at the mapping position by combining the direct lighting color and the indirect lighting color; and providing the final color to the rendering engine for use in rendering the CG representation of the physical material.

9 Claims, 14 Drawing Sheets

SHADING CG REPRESENTATIONS OF MATERIALS

CROSS REFERENCE TO RELATED APPLICATIONS

This application is a continuation application of, and claims priority to, U.S. patent application Ser. No. 14/278,025, for Shading CG Representations of Materials, filed on May 15, 2014. The disclosure of the foregoing application is incorporated here by reference.

BACKGROUND

This specification relates to shading computer graphics (CG) representations of materials. During the process of rendering a CG representation of a material, one or more shading techniques can be used to determine, e.g., the color and brightness of the surfaces of the material, based on the desired lighting in the rendered scene.

SUMMARY

In general, one innovative aspect of the subject matter described in this specification can be embodied in an apparatus that includes a light source having a lens for emitting light; a plurality of first planar mirrors, wherein the light source is movable to directly illuminate each planar mirror of the plurality of first planar mirrors; a sample support configured to suspend a material sample between the plurality of first mirrors and the light source, wherein the sample support is positioned such that each of the first mirrors reflects a respective view of the material sample from a different perspective; and a camera proximate to the light source and configured to capture a respective image of the first mirrors reflecting the material sample while the light source is positioned to directly illuminate each of the planar mirrors.

These and other embodiments can each optionally include one or more of the following features. The emitted light can be collimated light. Directly illuminating a first planar mirror can include emitting light from the lens of the light source that is reflected by a second mirror to intersect the first planar mirror. The camera can be further configured to provide the images to a system for use in generating data structures for shading a computer graphics representation of the material sample. The first planar mirrors can be arrayed so that respective surfaces of the first planar mirrors define an ellipsoid. A center of the material sample can be positioned at a first focal point of an ellipse formed by taking a cross section of the ellipsoid that passes through a center of the ellipsoid and is along a semi-axis of the ellipsoid. The camera can be positioned at a second focal point of the ellipse. The light source can be mounted on a rotating disc.

In general, another innovative aspect of the subject matter described in this specification can be embodied in methods that include the actions of obtaining a plurality of first images, wherein each first image includes a plurality of regions, wherein each region corresponds to a respective mirror of a plurality of mirrors and comprises a reflected image of a first sample of a material reflected by the corresponding mirror, and wherein the plurality of mirrors define an ellipsoid; for each first image: generating a respective region image for each region in the first image by extracting the reflected image corresponding to the region from the first image, wherein each region image comprises a respective plurality of region image pixels, and palletizing each of the region images; and providing each palletized image to a computer graphics (CG) rendering engine for use in shading a CG representation of the material.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of these installed on the system that in operation causes the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method can further include obtaining geometry calibration data and color calibration data for use in calibrating the plurality of first images. Generating the respective region image for each region in the first image can include: extracting the reflected image corresponding to the region from the first image using the geometry calibration data; and adjusting the color of the reflected image using the color calibration data to generate the region image. The method can further include for each region image pixel: dividing the ellipsoid defined by the plurality of mirrors into a first number of sectors, wherein a ray reflected by the material has an equal probability of landing in each of the sectors, dividing each of the sectors into a second number of pieces, wherein a ray reflected by the material has an equal probability of landing in each of the pieces, and generating a table having a plurality of cells, wherein each of the cells in the table stores data identifying a center of a respective piece of the ellipsoid. The method can further include providing the tables for each region image pixel to a rendering engine for use in determining effects of indirect lighting on the CG representation of the material. Dividing the ellipsoid defined by the plurality of mirrors into the first number of sectors can include iteratively accumulating local probabilities of subdivisions of a surface of the ellipsoid. The local probability of each subdivision can be a local brightness of the subdivision divided by an average brightness of the surface of the ellipsoid. Dividing each of the sectors into the second number of pieces can include iteratively accumulating local probabilities of subdivisions of the sector. The method can further include obtaining a plurality of second images, wherein each second image is a direct image of a second, larger sample of the material reflected by the corresponding mirror, and wherein each second image comprises a respective plurality of second image pixels; determining a respective most similar region image pixel for each second image pixel; and storing a mapping that associates each second image pixel with the corresponding most similar region image pixel for the second image pixel. Each second image can be taken at a respective angle, and wherein each of the respective angles corresponds to an angle at which a respective one of the plurality of mirrors reflects the first sample of the material. Determining a respective most similar region image pixel for each second image pixel can include: determining a respective signature for each region image pixel and each second image pixel; and selecting the most similar region image pixels based on the signatures. Determining the respective signature for each region image pixel and each second image pixel can include: computing a height of the pixel and heights of a pre-determined number of neighbors of the pixel; and computing the signature for the pixel based on the heights. Determining the respective signature for each region image pixel and each second image pixel can include computing the signature for the pixel based on a color matching. Selecting the most similar region image pixels based on the signatures can include selecting a region image pixel having a signature that has a smallest distance from the signature for the second image pixel as the most similar region image pixel from the second image pixel.

Particular embodiments of the subject matter described in this specification can be implemented so as to realize one or more of the following advantages. A CG representation of a material can be effectively shaded without obtaining multiple high-resolution images of a large sample of the physical materials. Representations of materials having complicated and varying textures can be effectively shaded. Representations of materials can be effectively shaded using less data and in a shorter amount of time.

In general, another innovative aspect of the subject matter described in this specification can be embodied in methods that include the actions of obtaining data describing a physical material, wherein the data describing the physical material includes a plurality of palletized images of a first sample of the physical material, wherein each of the palletized images comprises a respective reflected image of a first sample of the physical material reflected by a respective mirror of a plurality of mirrors; receiving a shading request to shade a particular point in a computer graphics (CG) representation of the physical material from a rendering engine, wherein the request identifies a mapping position of the particular point, a view direction at the mapping position, and a light direction at the mapping position; calculating a direct lighting color at the mapping position using the plurality of palletized images; calculating an indirect lighting color at the mapping position using the data describing the physical material; generating a final color at the mapping position by combining the direct lighting color and the indirect lighting color; and providing the final color to the rendering engine for use in rendering the CG representation of the physical material.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of these installed on the system that in operation causes the system to perform the actions. One or more computer programs can be configured to perform particular operations or actions by virtue of including instructions that, when executed by data processing apparatus, cause the apparatus to perform the actions.

These and other embodiments can each optionally include one or more of the following features. Positions of the plurality of mirrors can define a hemisphere. The method can further include generating a Voronoi diagram of a hemisphere defined by positions of a plurality of mirrors that each reflect a view of a material sample positioned above the plurality of mirrors from a different perspective; generating a two-dimensional table containing a plurality of cells, wherein each of the cells is mapped to the hemisphere by a respective horizontal and vertical angle pair; and for each of the cells: constructing a circle over a surface of the ellipsoid at the horizontal and vertical angle pair corresponding to the cell, and storing a plurality of (position, weight) pairs as data corresponding to the cell, comprising: randomly locating a pre-determined number of points within the circle, for each of the points, determining a respective closest mirror for each of the points, for each of the mirrors, determining a count of points that have the mirror as the closest mirror for the point, and determining a respective (position, weight) pair for each of the mirrors, wherein the position identifies the mirror and the weight is determined by dividing the count of points for the mirror by the pre-determined number.

Calculating the direct lighting color at the mapping position using the plurality of palletized images can include: identifying a first cell in the two-dimensional table corresponding to the view direction; identifying a second cell in the two-dimensional table corresponding to the light direction; determining a first contributing palletized image and a second contributing palletized image using the (position, weight) pairs stored in the first cell and the second cell; extracting a first pixel from the first contributing palletized image and a second pixel from the second contributing palletized image; and determining the direct lighting color using the extracted pixels and the weights for the first and second cells. Extracting a pixel from each of the contributing palletized images can include extracting the pixels by translating coordinates of the mapping position to a location in each contributing palletized image. Determining the direct lighting color using the extracted pixels and the weights can include: determining a color of the first pixel and a color of the second pixel; weighting the color of the first pixel based on the weights in the (position, weight) pairs used to select the first contributing palletized image; weighting the color of the second pixel based on the weights in the (position, weight) pairs used to select the second contributing palletized image; and summing the weighted colors to determine the direct lighting color. Generating the Voronoi diagram can include identifying a closest mirror for each point in the ellipsoid, wherein the closest mirror is the mirror having a shortest distance from the point to the center of the mirror. Generating the Voronoi diagram can further include assigning each point that shares a same closest mirror to a same zone in the Voronoi diagram. Constructing the circle over the surface can include selecting, from each possible circle covering at least two zones in the Voronoi diagram, the circle having the smallest radius. The data describing the physical material can include a K×M table for a first pixel in a first region image, wherein the first region image corresponds to the received view direction, wherein the first pixel corresponds to the received mapping position, and wherein each cell of the table contains a position of a center of a respective piece of an ellipsoid defined by the plurality of mirrors.

Calculating the indirect lighting color at the mapping position using the data describing the physical material can include: determining a first indirect lighting color at the mapping position, comprising: generating a first non-integer random number selected from a range of zero to K; generating a second non-integer random number selected from a range of zero to M; indexing the table using the first random number and the second random number to identify cells that bound the first random number and the second random number; identifying positions contained in the identified cells; combining the positions to generate a final position; and tracing a ray in the direction defined by the final position to determine the first indirect lighting color; and calculating the indirect lighting color at the mapping position based at least in part on the first indirect lighting color. Calculating the indirect lighting color at the mapping position based at least in part on the first indirect lighting color can include using the first indirect lighting color as the indirect lighting color. Calculating the indirect lighting color at the mapping position based at least in part on the first indirect lighting color can include: calculating one or more other indirect lighting colors; and combining the one or more other indirect lighting colors with the first indirect lighting color to generate a final indirect lighting color.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
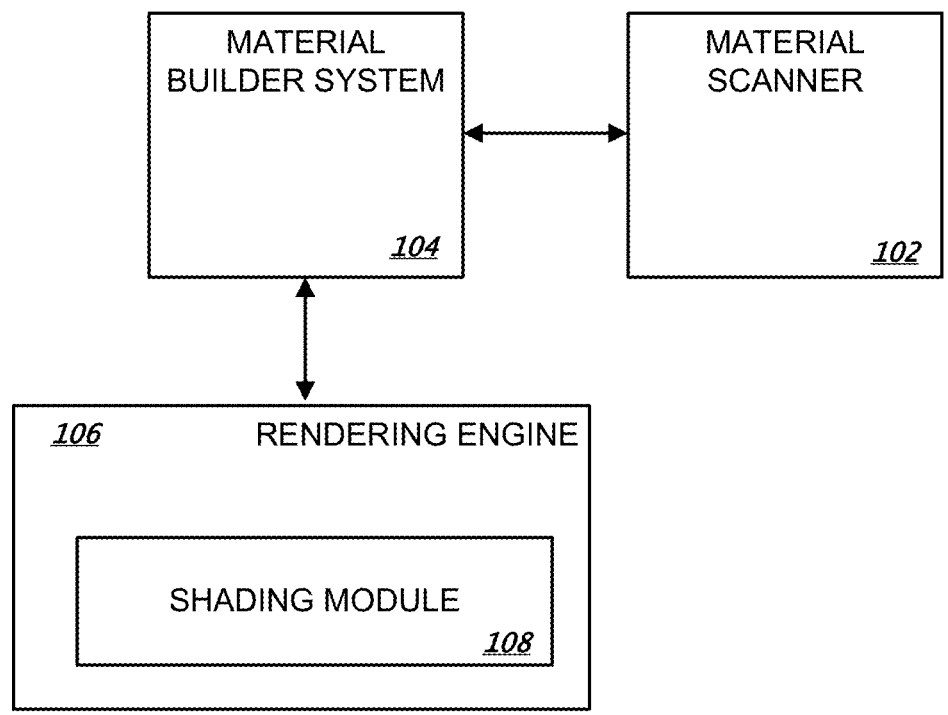
FIG. 1 is a high-level illustration of an example system for shading a computer graphic (CG) representation of a physical material.

FIG. 1 is a high-level illustration of an example system 100 for shading a computer graphic (CG) representation of a physical material, e.g., wood, fabric, leather, or metal, using a physical sample of the material.

The system 100 includes a rendering engine 106. The rendering engine 106 renders images or animations, e.g., using conventional techniques. Generally, the rendering engine 106 generates images or animations from a prepared scene, e.g., based on models or other rendering criteria. As part of the rendering process and in order to account for the effects of the desired lighting conditions of the rendered scene on the CG representations of physical materials, i.e., in order to accurately depict an image of a physical material in a three-dimensional model, the rendering engine 106 may need to obtain shading information for the CG representations from a shading module 108. The shading module 108 may be, e.g., a plug-in software component for the rendering engine 106.

The shading module 108 receives a request for shading information from the rendering engine 106 that identifies the material to be shaded, the mapping position that is to be shaded, i.e., a position in a UV mapping of the three-dimensional model of the image, the view direction for the mapping position and the light direction at the mapping position. The mapping position may be expressed in, for example, UV coordinates. In response to the request, the shading module 108 determines the final color at the mapping position using data obtained from a material builder system 104 and provides the final color to the rendering engine 106 for rendering. In order to determine the final color at the mapping position, the shading module 108 determines the effects of direct and indirect lighting at the position. Direct lighting is lighting provided from a light source without reflection from other surfaces. Indirect lighting is lighting provided by reflection of light from other surfaces, i.e., a reflection of light provided from a direct light source from surfaces surrounding an object in a scene. Determining the final color at a given mapping position is described in more detail below with reference to FIG. 10.

The material builder system 104 can be implemented as computer program instructions that execute on one or more data processing apparatus (e.g., personal computers, servers, tablet computers, smart phones, etc.) in one or more geographic locations. The material builder system 104 receives images of a sample of a physical material generated by a material sample scanner 102 and generates data structures for use by shading modules, e.g., the shading module 108, in shading CG representations of the material. Generating data for use in determining the effects of direct lighting on the shading a CG representation of the material under direct lighting is described below with reference to FIG. 6. Generating data for use in determining the effects of indirect lighting on the shading of the CG representation of the material is described below with reference to FIG. 7.

The material sample scanner 102 is an apparatus that generates images of the physical sample of the given material and provides them to the material builder system 104. Each image generated by the material sample scanner 102 includes multiple images of the sample at varying view and lighting directions. An example of a material sample scanner is described below with reference to FIG. 2.

Figure 2A:
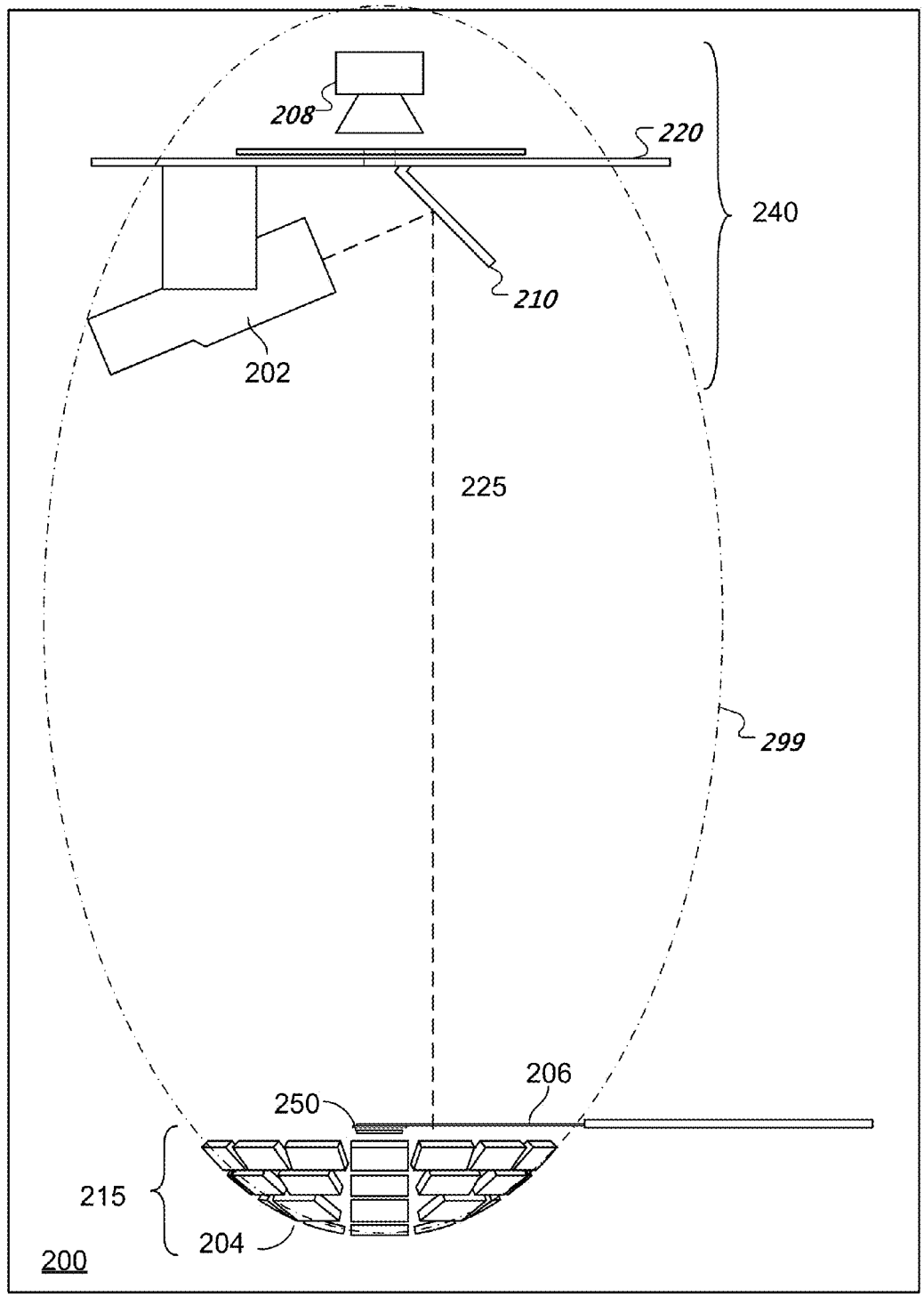
FIG. 2A is a diagram of an example material sample scanner.

FIG. 2A is a diagram of an example material sample scanner 200. The material sample scanner 200 is an apparatus that generates images of a sample of material 250. By way of illustration, the material can be a piece of fabric, wood, leather, fur, carpet, metal, glass, plastic, a combination of these, or other materials. The dimensions of the sample 250 can be, for example, approximately one inch by one inch. Other sample sizes are possible. Generally, the sample 250 will be a small portion of a material that is to be shaded during rendering.

The scanner 200 includes a light source-camera assembly 240. The light source-camera assembly 240 includes a light source 202 and a camera 208. The light source 202 includes a lens that emits light directed at a mirror 210, which reflects the light toward a mirror assembly 215.

The mirror assembly 215 includes a set of planar mirrors 204. The mirrors 204 are arranged so that they define an ellipsoid. That is, the mirrors 204 are positioned so that the reflective surfaces of the mirrors approximate a portion of an outer surface of an ellipsoid. Generally, the dimensions of the reflective surfaces of the mirrors are larger than those of the sample 250. For example, if the dimensions of the sample are one inch by one inch, each mirror may be two inches by two inches.

The light source 202 is movable to directly illuminate each of the mirrors 204. That is, the light source 202 is movable radially and the angle of the light source 202, the angle of the mirror 210, or both may be adjustable in order for, at some combination of radial position of the light source 202 and angles of the light source 202 and the mirror 210, the reflective surface of each of the mirrors to be directly illuminated by light emitted by the lens of the light source and reflected by the mirror 210. In the illustrated example of FIG. 2, for instance, the light source 202 is positioned such that an example light ray 225 emitted by the light source 202 is reflected by the mirror 210 and directly intersects the reflective surface of one of the planar mirrors 204. In order for the light source 202 to be movable to illuminate each of the mirrors, the light source 202 can be mounted on a rotating disc 220 and on a track that allows the light source 202 to traverse along the radius of the disc. The light source may be, e.g., a collimated light source, i.e., a light source that produces collimated light rays, i.e., light rays that are approximately parallel to one another.

The mirror assembly 215 also includes a sample support 206. The sample support 206 is configured to suspend the sample 250 between the set of mirrors 204 and the light source 202 within the scanner 200. In particular, the sample support 206 is configured to suspend the sample so that the sample is facing away from the light source 202 and the center of the sample is approximately at one focal point of an ellipse 299 defined by the mirrors 204, i.e., the ellipse 299 that is formed by taking a cross section of the ellipsoid through its center and is along one of its semi-axes. By positioning the mirrors 204 and the material sample 250 in this configuration, each of the mirrors 204 will reflect an image of the sample at a respective angle when the light source 202 is directly illuminating any one of the mirrors 204. In some implementations, the sample support 206 is further configured to allow the sample to be rotated along one or more axes.

The camera 208 is positioned proximate to the light source 202. For example, the camera 208 may be positioned approximately above the center of the sample. In particular, the camera 208 may be positioned approximately at the other focal point of the ellipse 299. The positioning of the camera 208 relative to the set of mirrors 204 and the sample 250 is described in more detail below with reference to FIG. 2B.

In some implementations, the camera 208 is configured to capture an image of the mirrors 204 in response to a request, e.g., a request received from a material builder system, e.g., the material builder system 104 of FIG. 1. In particular, the camera 208 can capture a respective image of the mirrors 204 when the light source 202 is positioned to directly illuminate each of the mirrors. For example, if there are 40 positions and 40 mirrors, the camera 208 can be configured to capture 40 images, each of which includes 40 reflected images of the sample with the light source positioned to directly illuminate a respective one of the mirrors. A reflected image of the sample 250 is an image of one of the mirrors 204 while the mirror 204 is reflecting an image of the sample 250 supported by the sample support 206. While a scanner 200 with 40 mirrors is used as an example, any number of mirrors and, consequently, images is possible.

Once the images of the mirrors have been captured, the images can be provided to the material builder system for processing. In some implementations, prior to being processed by the material builder system, the images are converted to a particular format, e.g., the OpenEXR format. In other implementations, the material builder system processes the images in the format in which they are captured by the camera 204.

Figure 2B:
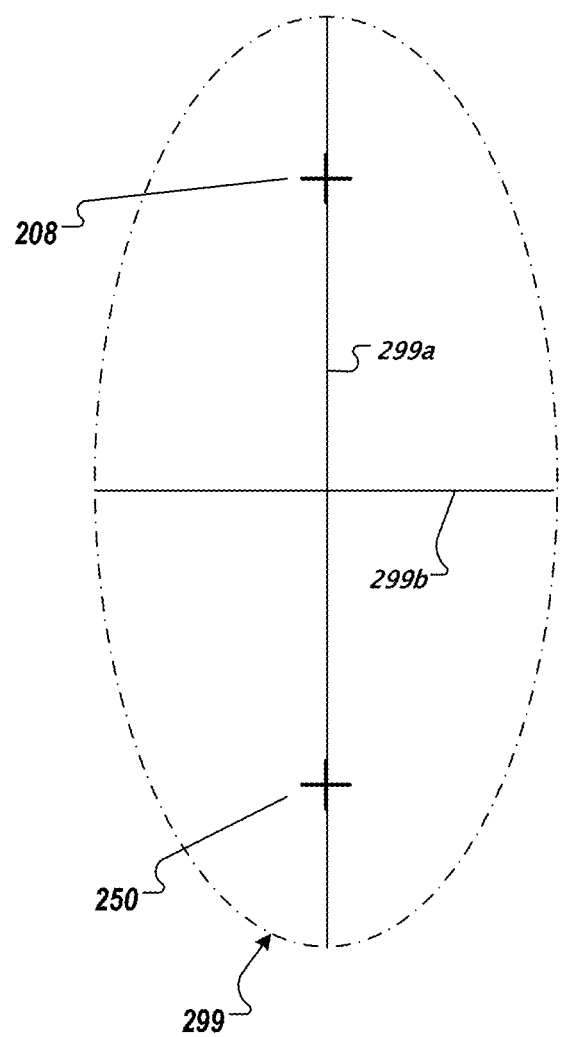
FIG. 2B illustrates an example configuration of components within a material sample scanner.

FIG. 2B illustrates an example configuration of components within the material sample scanner 200 of FIG. 2A. An ellipse 299 is shown that is defined by the set of mirrors 204 of FIG. A. The material sample 250 is positioned at the first focal point of the ellipse 299, i.e., the focal point closest to the set of mirrors 204. The camera 208 is positioned at the other focal point of the ellipse 299. As an example, the major axis 299a of the ellipse 299, i.e., the axis that runs through the sample 250 and the camera 208, may be approximately 120 centimeters in length and the minor axis 299b may be approximately 66 centimeters in length. In this example, the distance between the material sample 250 and the camera 208 is approximately 50 centimeters. Other dimensions are possible, however.

Figure 3:
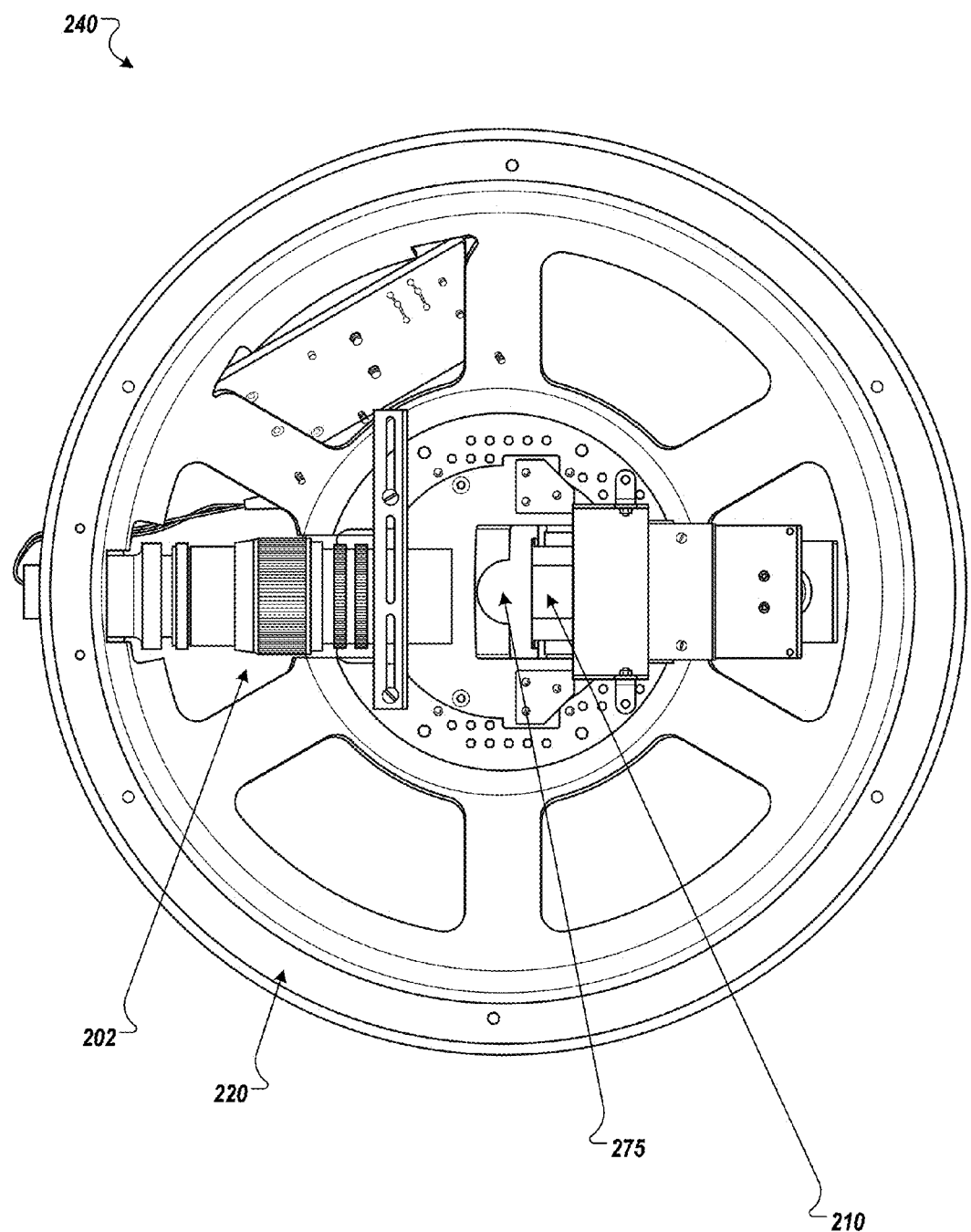
FIG. 3 is a diagram of the bottom of a light source-camera assembly.

FIG. 3 is a diagram of the bottom of the light source-camera assembly 240 of FIG. 2A. The light source-camera assembly 240 includes a light source 202 that is positioned to emit light rays that are reflected off of a mirror 210 towards a set of mirrors, e.g., the set of mirrors 204 of FIG. 2A. The light source 202 is mounted on a rotating disc 220 in order to allow the light source 202 to be movable radially. As described above, the angle of the light source 202, of the mirror 210, or both may be adjustable. The light source-camera assembly 240 includes an aperture 275. A camera, e.g., the camera 208 of FIG. 2A, may be positioned over the aperture.

Figure 4:
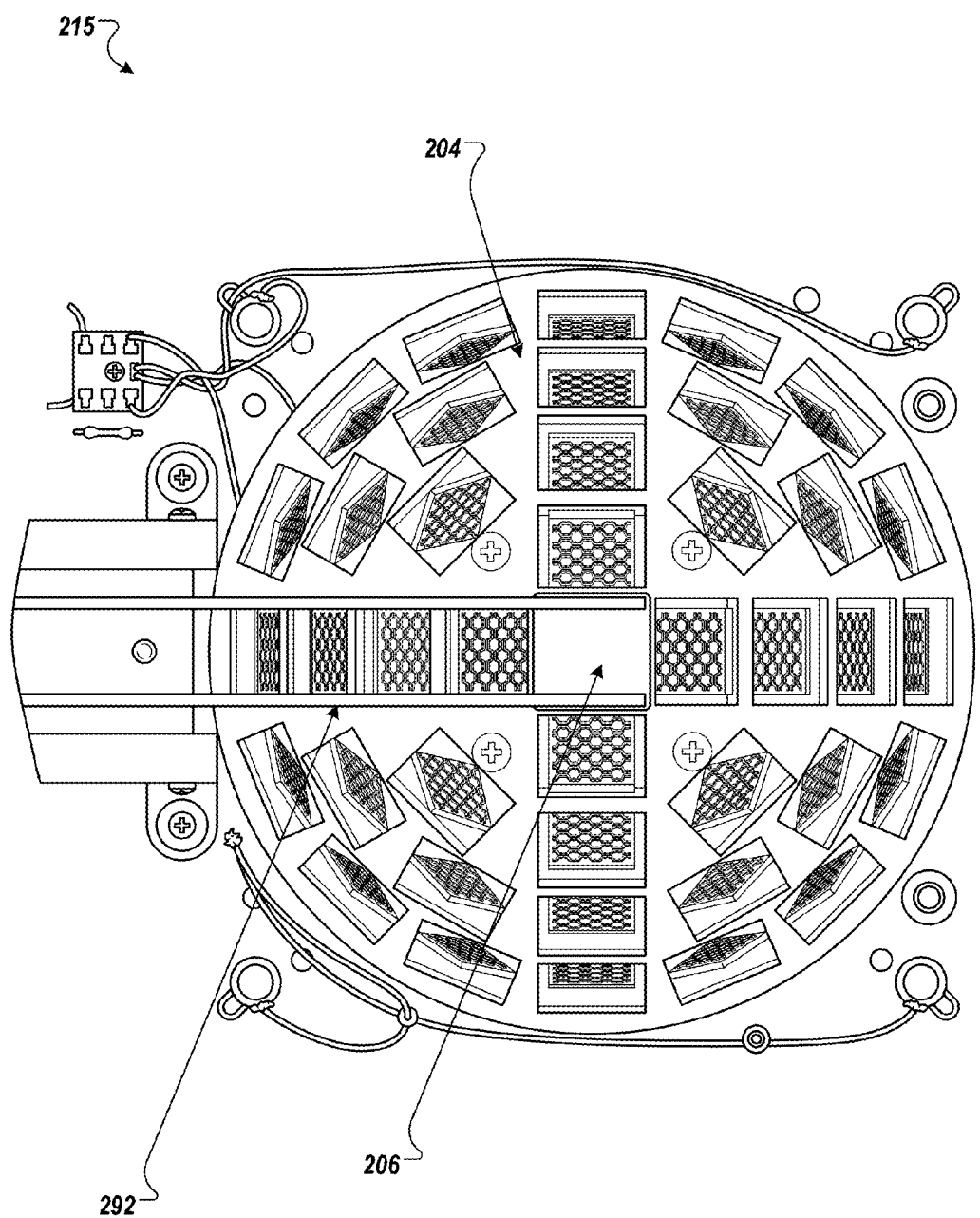
FIG. 4 shows a view of a mirror assembly from above.

FIG. 4 shows a view of the mirror assembly 215 of FIG. 2A from above. The mirror assembly 215 includes a set of planar mirrors 204. As described above, the mirrors in the set of planar mirrors 204 are positioned so that the reflective surfaces of the mirrors approximate a portion of an outer surface of an ellipsoid. The mirror assembly 215 also includes a sample support 206. The sample support 206 is configured to suspend a sample above the set of planar mirrors 204 using support arms 292. While not visible in the view from above, the sample is suspended on the underside of the sample support 206. The support arms 292 are positioned so that they do not obstruct the view of any of the mirrors in the set of planar mirrors 204 in images taken from a camera positioned above the mirror assembly 215.

Figure 5:
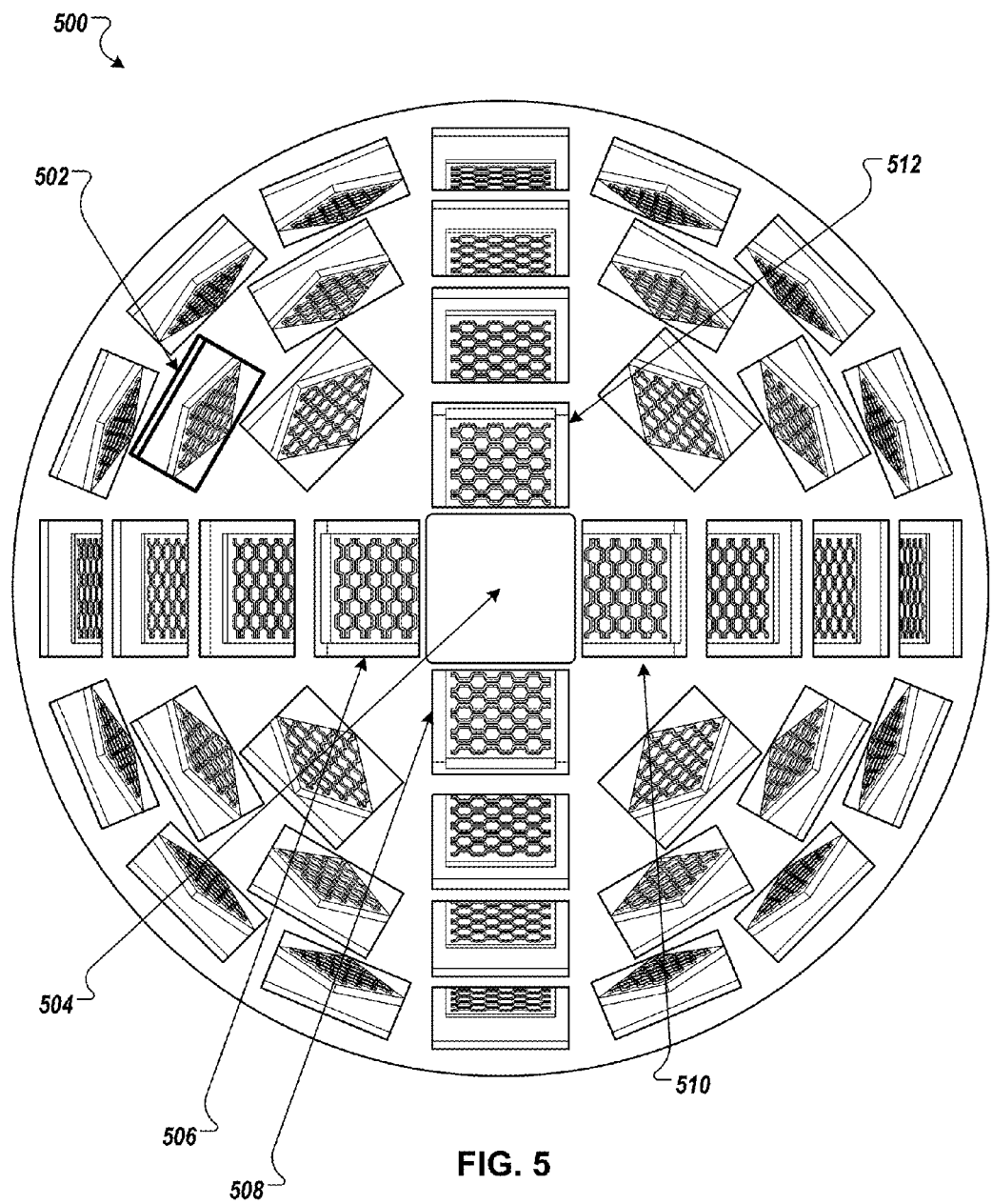
FIG. 5 is an example mirror image generated by a material sample scanner.

FIG. 5 is an example mirror image 500 generated by a material sample scanner, e.g., the material sample scanner 200 of FIG. 2A. The mirror image 500 includes a set of regions, e.g., the region 502, with each of the regions corresponding to an area of the image 500 that contains the reflection of a respective mirror in a set of planar mirrors, e.g., the set of mirrors 204 of FIG. 2A, and an image of the top side of a sample support 504. Each region includes a respective reflected image of a sample of the material that is to be shaded. The mirror image 500 is an image that is generated while a light source, e.g., the light source 202 of FIG. 2A, was directly illuminating one of the mirrors in the set of mirrors and the sample was suspended by the sample support. For example, when the mirror image 500 was taken, the light source may have been directly illuminating the mirror that corresponds to the region 502 in the mirror image 500. In this case, the region 502 will include a reflected image of the sample as reflected by the corresponding mirror while being directly illuminated by the light source.

Figure 6:
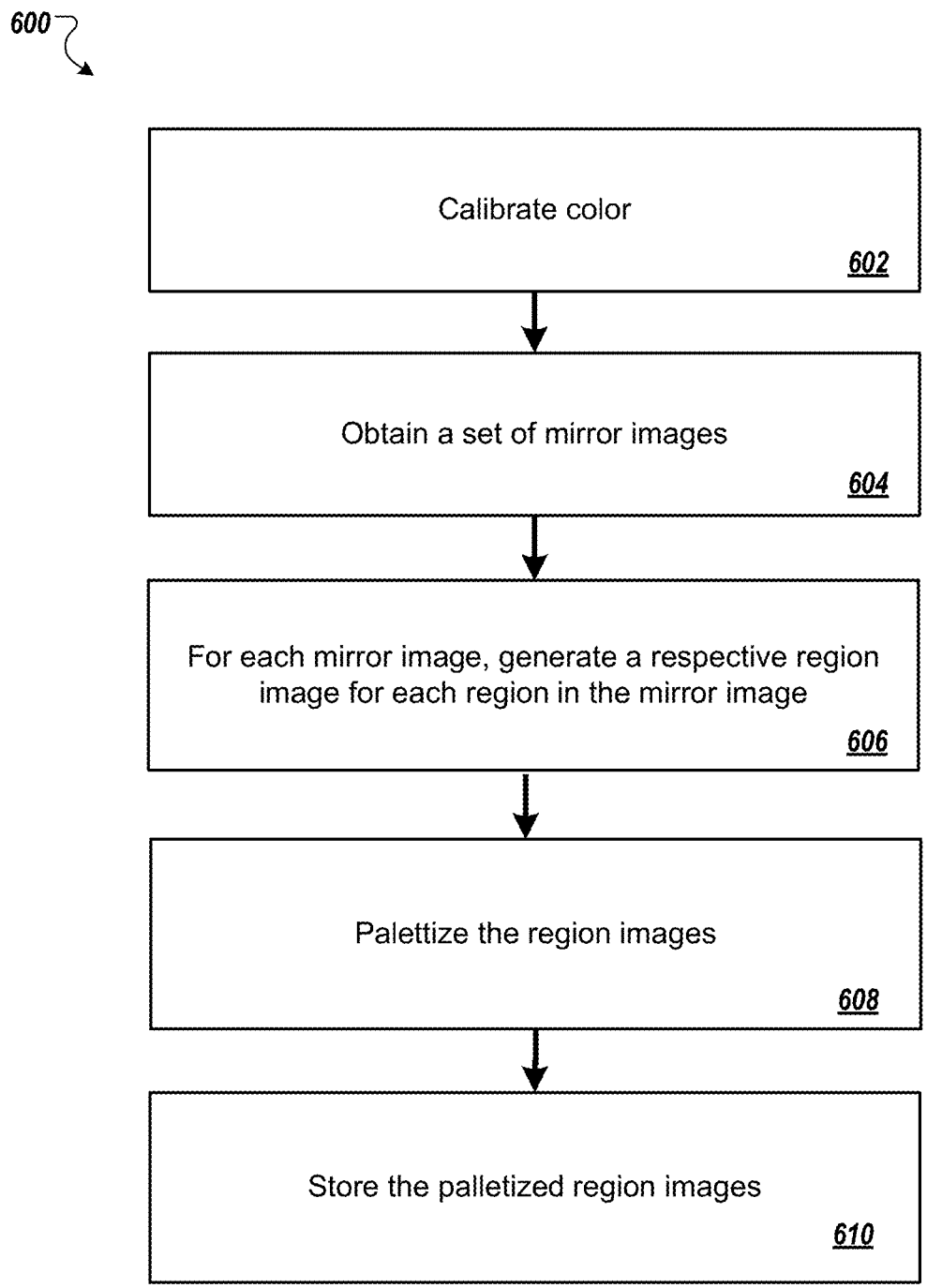
FIG. 6 is a flow diagram of an example technique for generating palletized images for use in determining the direct lighting for a CG representation of material.

FIG. 6 is a flow diagram of an example technique 600 for generating palletized images for use in determining the effects of direct lighting for a CG representation of material. For convenience, the technique 600 will be described as being performed by a system of one or more data processing apparatus located in one or more locations. For example, a material builder system, e.g., the material builder system 104 of FIG. 1, appropriately programmed, can perform the technique 600.

The system calibrates 602 the color and, optionally, the geometry of the images produced by a material sample scanner, e.g., the material sample scanner 102 of FIG. 1. An example technique for calibrating the geometry and the color will be described below with reference to FIG. 8. As a result of the calibration process, the system generates color calibration data that identifies a color transformation to be applied to the reflected images in the images produced by the material sample scanner and, optionally, geometry calibration data that identifies locations of the reflected images in the images produced by the material sample scanner.

The system obtains 604 a set of mirror images generated by the material sample scanner. Each mirror image, e.g., mirror image 500 of FIG. 5, includes a set of regions, with each of the regions corresponding to a respective mirror in a set of mirrors, e.g., the set of mirrors 204 of FIG. 2A. Each region, e.g., region 502 of FIG. 5, includes a respective reflected image of a sample of the material that is to be shaded. Generally, the set of mirror images will include the same number of mirror images as the number of mirrors in the set of mirrors, with the set of mirror images including images taken while the light source is directly illuminating different mirrors in the set of mirrors.

For each mirror image, the system generates 606 a respective region image for each region in the mirror image using the color calibration data and, optionally, the geometry calibration data. The system generates the region images by extracting the reflected image from each region. In particular, the system extracts the content of each of the regions in the mirror image using the locations identified in the geometry calibration data or, if no geometry calibration is performed, by identifying the locations of the regions directly from the mirror image.

As part of generating the region images, the system generates data defining a hemisphere using the locations of the mirrors. That is, the system uses data identifying the locations of the mirrors to determine a respective angle of the center of each mirror with respect to either the material sample or to the light source. The system then uses those angles to define a hemisphere having a predetermined radius, e.g., a radius of one.

Optionally, the system converts each region into rectangular form. The system can then adjust the color of each pixel in each region based on the color calibration data in order to generate the region images.

The system palletizes 608 the region images and stores 610 the palletized images. Generally, palletizing an image reduces the colors used in the image to a predetermined number of colors. In particular, the system replaces the color of each pixel with a color index that points to a cell in a palette table. The palette table contains a list of the colors used in the picture. The system can palletize the region images using, e.g., conventional palletization techniques. The system indexes the stored palletized image by (light, camera) pair, where the "light" value for each palletized image identifies the mirror that was being directly illuminated while the palletized image was taken, and the "camera" value for each image identifies the mirror over which the camera was positioned while the palletized image was taken. The system can generate the identifiers for the mirrors by assigning each mirror a respective integer ranging from one to the total number of mirrors.

The stored palletized images can be provided to a shading module, e.g., the shading module 108 of FIG. 1, for use in determining the direct lighting for a CG representation of the material. The system can provide the palletized images in association with the corresponding (light, camera) pair for each image.

Figure 7:
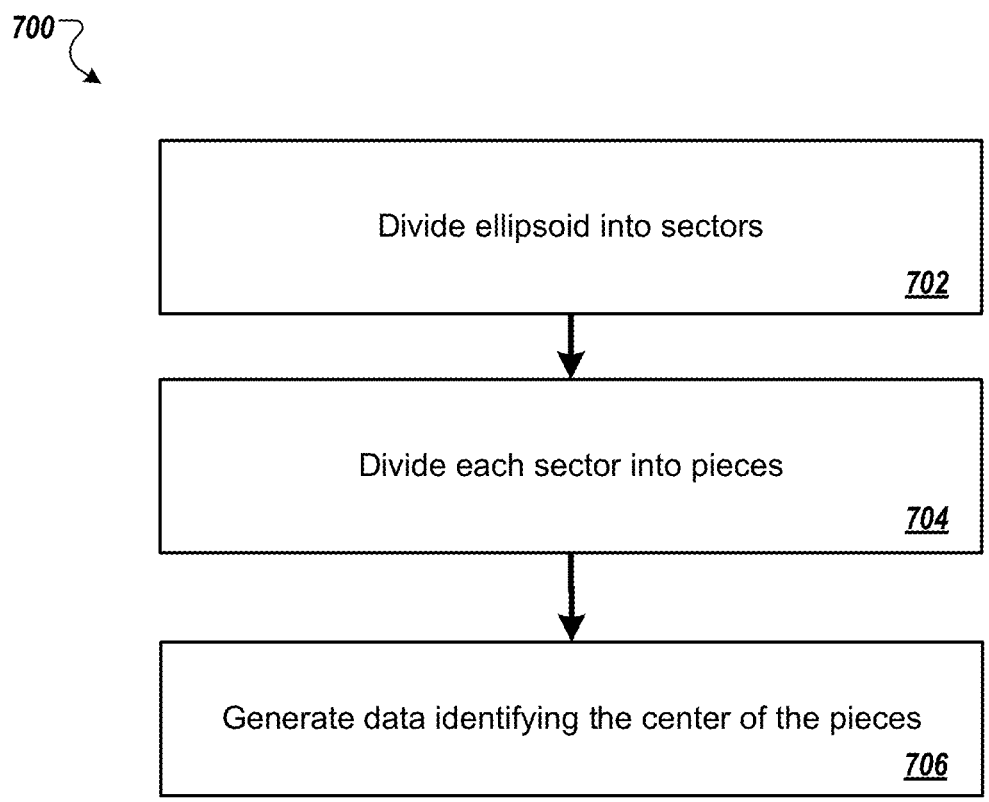
FIG. 7 is a flow diagram of an example technique for generating data structures for use in determining the effects of indirect lighting for a CG representation of a material.

FIG. 7 is a flow diagram of an example technique 700 for generating data structures for use in determining the effects of indirect lighting for a CG representation of a material. For convenience, the technique 700 will be described as being performed by a system of one or more data processing apparatus located in one or more locations. For example, a material builder system, e.g., the material builder system 104 of FIG. 1, appropriately programmed, can perform the technique 700.

In some implementations, the technique 700 is performed for each pixel in each region image generated from mirror images obtained from the material sample scanner.

The system divides 702 the hemisphere defined by the set of mirrors into a first number of sectors. In particular, the system divides the hemisphere so that a ray reflected by the material has an equal probability of landing in each of the sectors. The system can construct these equal probability sectors based on local probabilities, where each local probability is a local brightness divided by the average brightness of the entire hemisphere. The brightness of any given subdivision of an image can be measured as, e.g., the average value of the red (R), green (G), and blue (B) colors in the subdivision, i.e., (R+G+B)/3.

In order to divide the hemisphere into sectors, the system iteratively accumulates subdivisions of the hemisphere surface. That is, the system selects small subdivisions of the hemisphere surface, e.g., with each subdivision being 1/10000 of the entire hemisphere surface. For example, the system may select the subdivisions by traversing the hemisphere surface along each axis using a pre-determined step size, e.g., one degree.

The system sums the probability of each successive subdivision until the summed probabilities sum to 1/K, where K is the desired first number of sectors. The system then defines the first sector as the aggregate of the subdivisions included in the sum and continues the process until each sector is defined.

The system divides 704 each of the sectors into a second number of pieces. In particular, the system divides each sector so that a ray reflected by the material has an equal probability of landing in each of the pieces. The system can divide each sector into the second number of pieces using, e.g., the same technique described above for dividing the hemisphere.

The system generates 706 a data structure that stores data identifying the center of each of the pieces. For example, if there are K sectors each divided into M pieces, the system can generate a K×M table, with the data in each entry of the table being the position of the center of each of the pieces.

Once the technique 700 has been performed for each pixel in each region image, the system can provide the data structure to a shading module, e.g., the shading module 108 of FIG. 1, for use in determining the indirect lighting for a CG representation of the material.

In addition to the data identifying the center of each of the pieces of the hemisphere for each of the pixels and the palletized region images, the system can also provide to the shading module information identifying the dimensions of the physical sample of the material, the number of regions in each mirror image, the locations of each of the regions in the mirror image, and the data identifying the hemisphere defined by the mirrors.

Figure 8:
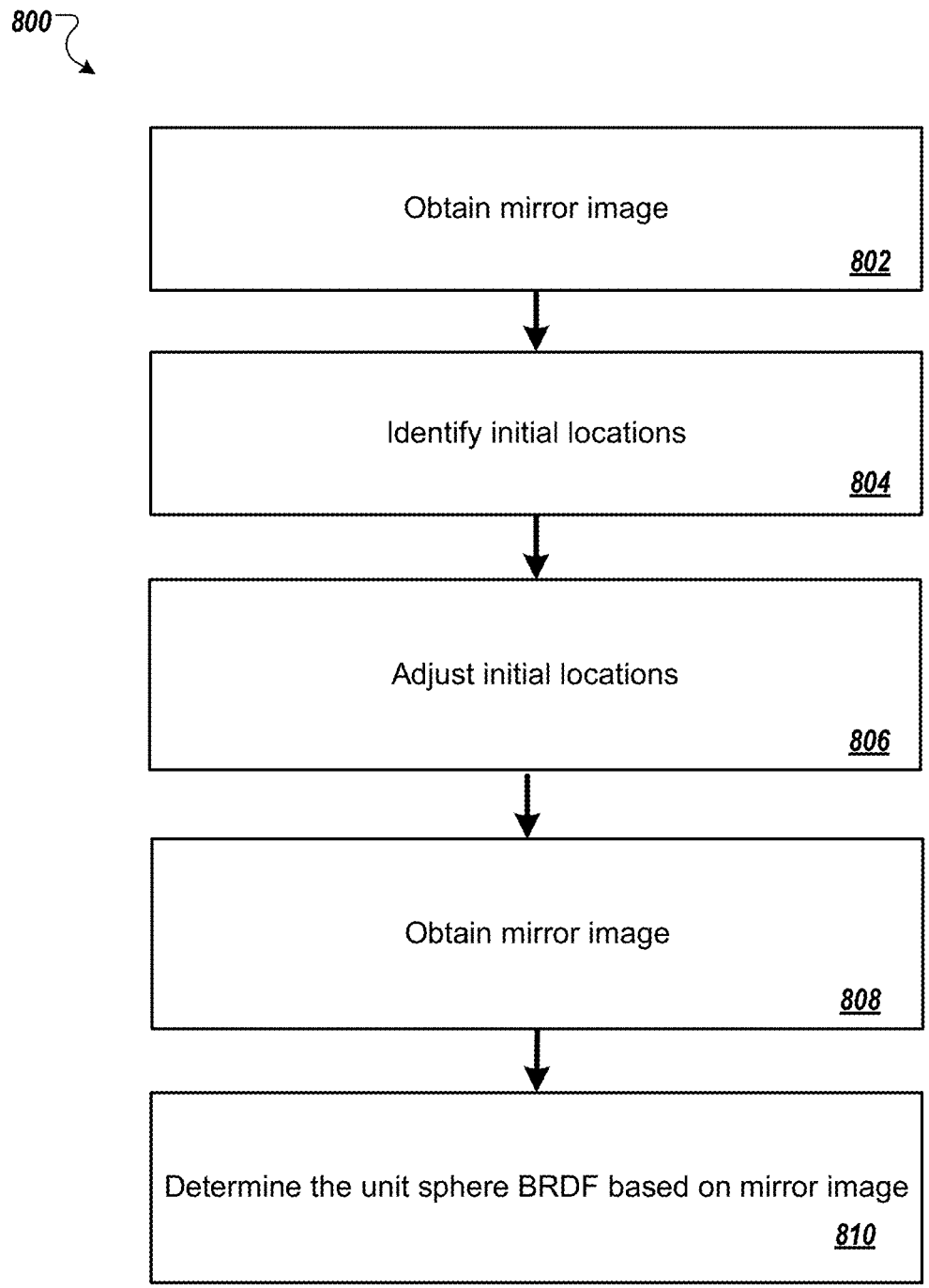
FIG. 8 is a flow diagram of an example technique for calibrating the geometry and color of images produced by a material sample scanner.

FIG. 8 is a flow diagram of an example technique 800 for calibrating the geometry and color of images produced by a material sample scanner (e.g., material scanner 102). For convenience, the technique 800 will be described as being performed by a system of one or more data processing apparatus located in one or more locations. For example, a material builder system, e.g., the material builder system 104 of FIG. 1, appropriately programmed, can perform the technique 800.

The system obtains 802 a mirror image generated by the material sample scanner (e.g., material scanner 102) using a sample material having a specific, pre-determined pattern. For example, the pattern may be a checkerboard pattern. Other patterns are possible.

The system identifies 804 the initial locations of each of the regions in the mirror image. For example, the system can analyze the mirror image to identify each edge of each region in the mirror image and determine each intersection of two identified edges using edge detection techniques, for example. Each point of intersection can be identified as a corner of a region and the location of the regions can be defined by the identified edges and corners.

In some implementations, the system adjusts 806 the initial locations based on the pre-determined pattern on the material. In particular, for each region, the system performs a low-frequency Fourier analysis and adjusts the initial locations based on the result of the Fourier analyses. The system determines the average phase and frequency of the four largest regions in a given mirror image and adjusts the locations of each initial corner in order to equalize the phase of their region to the average phase and frequency for the four largest regions. The system stores the adjusted location data as geometry calibration data that identifies the locations of reflected images in the images produced by the material sample scanner. In some implementations, the system does not generate geometry calibration data but instead identifies initial locations of regions in each mirror image processed by the system, e.g., by identifying the edges and intersections as described above.

The system obtains 808 a mirror image generated by the material sample scanner of a white material having a pure diffuse bidirectional reflectance distribution function (BRDF).

The system determines 810 the unit sphere BRDF from the mirror images and stores the data as color calibration data that identifies a color transformation to be applied to the color of the reflected images. That is, the system can use the color calibration data to normalize the color of images taken by the material sample scanner before they are used by a shading module.

While the above description describes generating data for use by a shading module in shading a CG representation of a physical material, the above data is generated based on mirror images of a small sample of the material. In some circumstances, it may be beneficial to obtain so-called direct images of a large sample of the material and provide a mapping to the shading module that identifies, for each pixel in one of the direct images of the large sample, the most similar pixel in any of the mirror images to the pixel. For example, when the physical sample includes a pattern that is either non-repeating or a pattern that repeats but that cannot be entirely captured in a small sample of the material, the shading module may need to use the provided mapping to map the pixels of the large sample to the most similar pixels in the mirror images. Generally, the surface area of the large sample will be approximately ten times that of the smaller sample used to generate the mirror images. Generating the mapping is described below with reference to FIG. 9.

Figure 9:
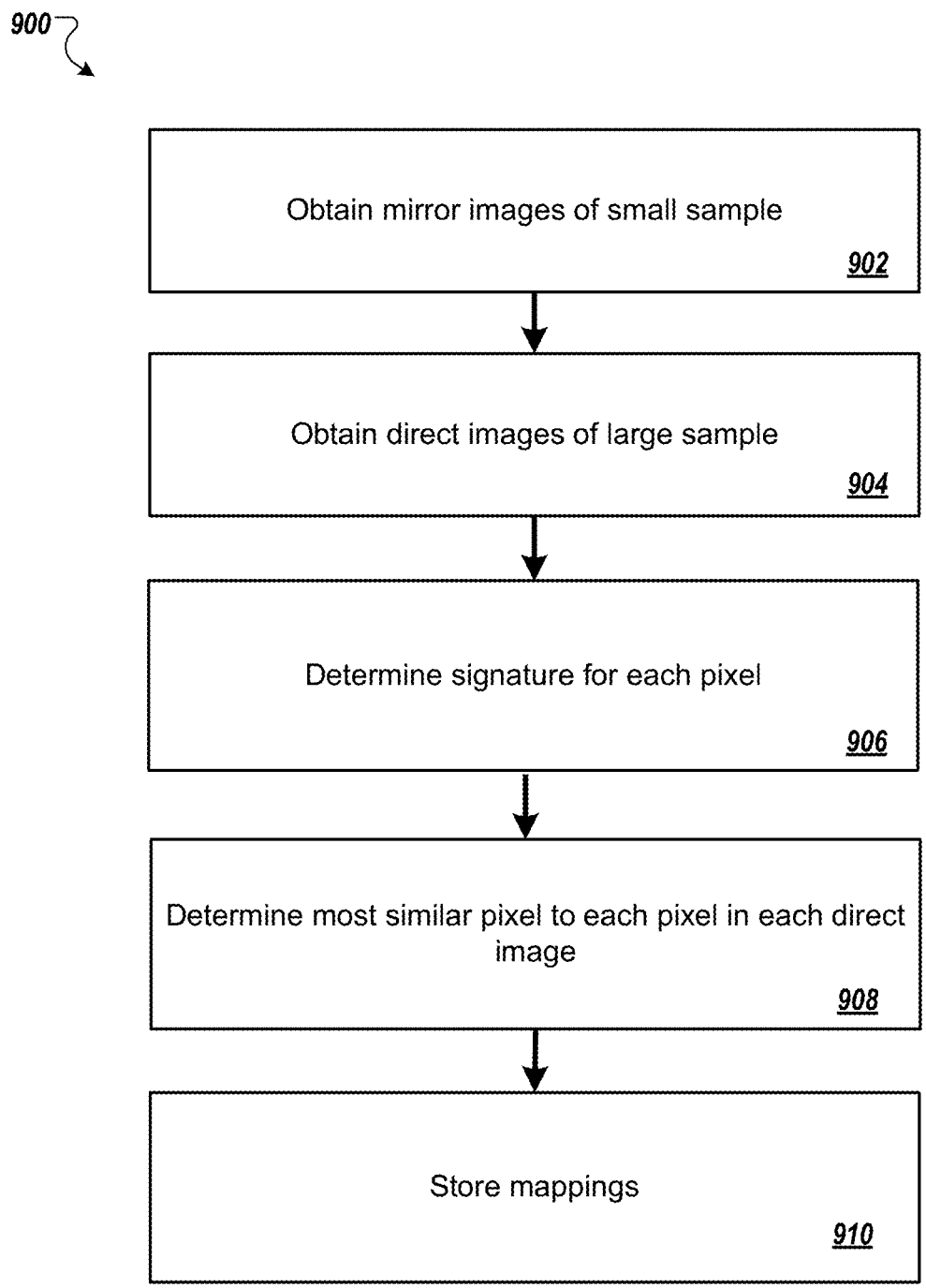
FIG. 9 is a flow diagram of an example technique for generating a mapping between pixels in direct images and pixels in mirror images.

FIG. 9 is a flow diagram of an example technique 900 for generating a mapping between pixels in direct images and pixels in mirror images. For convenience, the technique 900 will be described as being performed by a system of one or more data processing apparatus located in one or more locations. For example, a material builder system, e.g., the material builder system 104 of FIG. 1, appropriately programmed, can perform the technique 900.

The system obtains 902 a set of mirror images of a small sample of a physical material from a material sample scanner, e.g., the material sample scanner 102 of FIG. 1.

The system obtains 904 a set of direct images of a large sample of the physical material. Generally, each direct image is taken at an angle that corresponds to the angle at which one of the mirrors in the material sample scanner reflects the image of the small sample. For example, the set of direct images may include four images that are each captured at a respective angle that corresponds to a respective angle of one of the four mirrors in the set of mirrors 204 that appear closest to the sample in the mirror images, e.g., the mirrors corresponding to the regions 506, 508, 510, and 512 of FIG. 5.

The system determines 906 a signature for each pixel in each of the direct images. Each signature is a set of values that represents the pixel. For example, the signatures may be n-dimensional vectors, where n is a pre-determined integer. The system may compute the signature for a pixel in any of a variety of ways.

In some implementations, the system may compute the signature for a pixel by computing the height of the pixel and the height of a pre-determined number, e.g., eight, neighbors of the pixel in the image. The signature may then be computed based at least in part on the heights. For example, the signature may be a vector of the height values. Generally, because the surface of the physical material is not flat, the value of the height of a given pixel is the value of the variation of the surface of the physical material in the vertical direction at the point that the pixel represents.

The system computes the heights for the pixel and the neighboring pixels from a height map for the material. In order to generate the height map, the system generates a normal field from four images of the material. That is, the system can solve two systems of linear equations, each containing three of the four images, to generate the height for each point. The systems of linear equations can be generated by assuming that the measured brightness at a point is proportional to the dot product between the surface normal at the point and the light direction at the point. The system can combine the solutions of the two systems to generate the height at the point, e.g., using some of the components of the solution of the first system and the other components of the normal of the solution of the second system.

From the normal field, the system iteratively determines the height map. In particular, the initial iteration assumes zero height for all the pixels. For each pixel, the system calculates the normal based expected difference to the neighbor pixels and compares it to the difference in the normal field. The system subtracts the error from the current height to generate the final height for the iteration. Once the height map converges to a relatively persistent state between iterations, the convergent height map is used as the final height map to determine the heights of the pixels for the signature.

In other implementations, the system may generate the signature for a pixel based on a color matching. In order to generate a color-matched signature for a pixel, the system identifies the pixels surrounding the pixel of interest in each of the four images. For example, for each image, the system can generate a three by three grid of pixels with the pixel of interest being at the center of the grid. The system then generates the signature for the pixel based on the RGB values for each of the pixels in each of the grids. For example, the signature may be an ordered list of all of the RGB values.

The system then determines 908 the most similar pixel from any of the region images for each pixel in each of the direct images. Generally, the most similar region image pixel to any given direct image pixel is the mirror image pixel having a signature that has the smallest distance between it and the signature for the direct image pixel. In particular, when the signatures are represented by n-dimensional vectors, the distance d between a signature A and a signature B satisfies:

$$d=(A_1-B_1)^2+(A_2-B_2)^2+\ldots+(A_n-B_n)^2.$$

The system stores 910 a mapping that associates each pixel in the direct images with the most similar pixel to the pixel in one of the mirror images. For example, the system can store data associating the coordinates of the pixel in the direct image with the coordinates of the most similar pixel in the mirror image to which it belongs.

Figure 10:
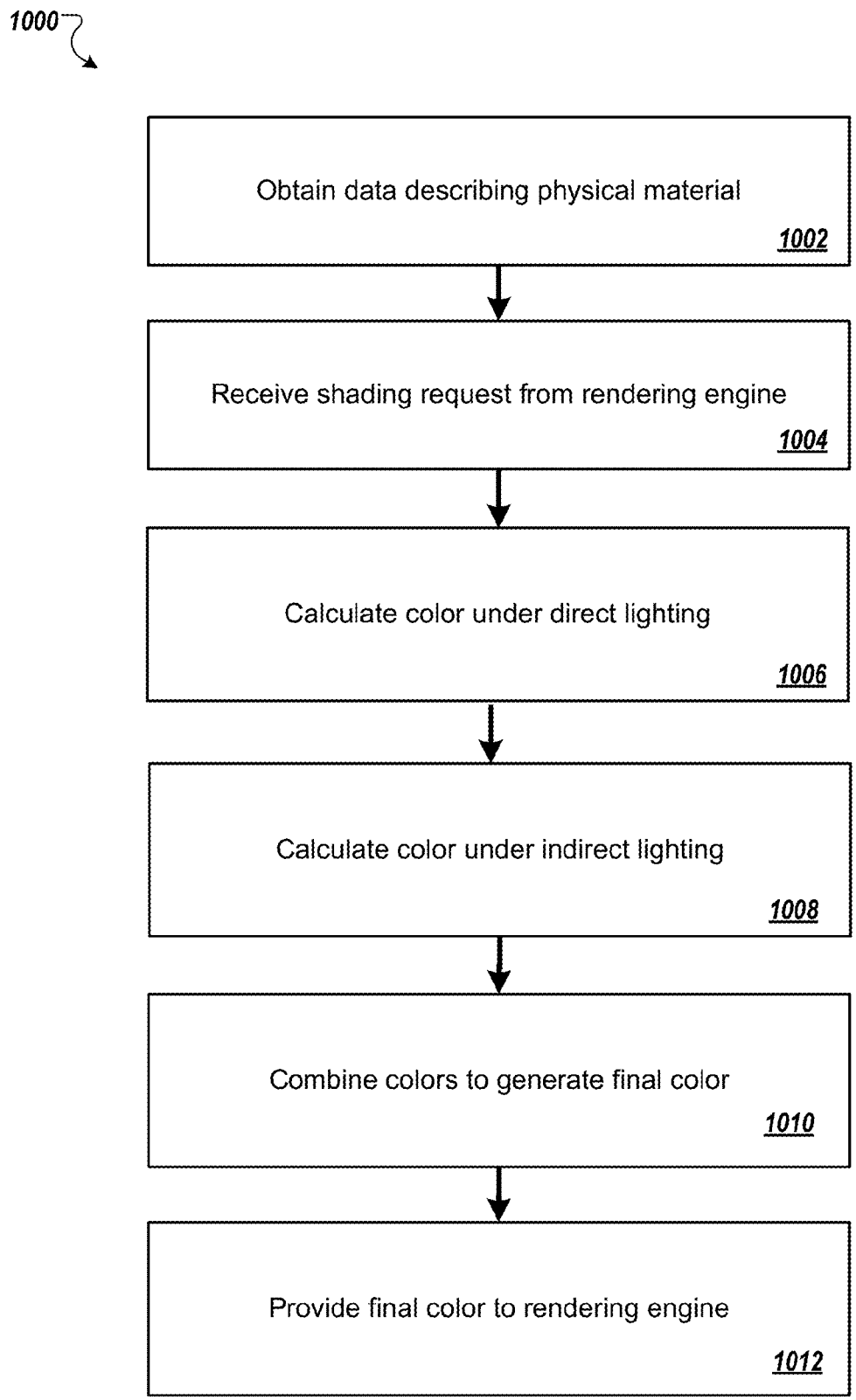
FIG. 10 is a flow diagram of an example technique for calculating the final color at a given mapping position.

FIG. 10 is a flow diagram of an example technique 1000 for calculating the final color at a given mapping position. For convenience, the technique 1000 will be described as being performed by a system of one or more data processing apparatus located in one or more locations. For example, a shading module, e.g., the shading module 108 of FIG. 1, appropriately programmed, can perform the technique 1000.

The system obtains data describing a physical material (step 1002) from a material builder system, e.g., the material builder system 104 of FIG. 1. The data includes data for use in calculating the effects of direct and indirect lighting at particular points on CG representations of the physical material. The system can obtain the data at various times, e.g., in response to receiving a request to shade the CG representation of the physical material or before receiving the request. Depending on the physical material, the data may include data associating the coordinates of each pixel in each of a set of direct images of a large sample of the physical material with data identifying the most similar pixel in any of the mirror images of a small sample of the physical material.

The system receives a shading request from a rendering engine (step 1004), e.g., the rendering engine 106 of FIG. 1. The shading request identifies the material to be shaded, the mapping position that is to be shaded, i.e., a position in a UV mapping of the three-dimensional model of the image, the view direction for the mapping position and the light direction at the mapping position.

If the data obtained by the system included data associating the coordinates of each pixel in each of a set of direct images of a large sample of the physical material with data identifying the most similar pixel in any of the mirror images of a small sample of the physical material, the system can convert the mapping position identified in the request into a point in the mirror images of the small sample using the data. The system can then use that position in calculating the final color.

The system calculates the color under direct lighting at the mapping position identified in the request using the data describing the physical material (step 1006). An example technique for calculating the color under direct lighting is described below with reference to FIG. 11.

The system calculates the color under indirect lighting at the mapping position using the data describing the physical material (step 1008). An example technique for calculating the color under indirect lighting is described below with reference to FIG. 12.

The system combines the colors to generate the final color at the mapping position (step 1010). For example, the system can sum the color under direct lighting and the color under indirect lighting to generate the final color.

The system provides the final color to the rendering engine for use in rendering the CG representation of the physical material (step 1012).

Figure 11A:
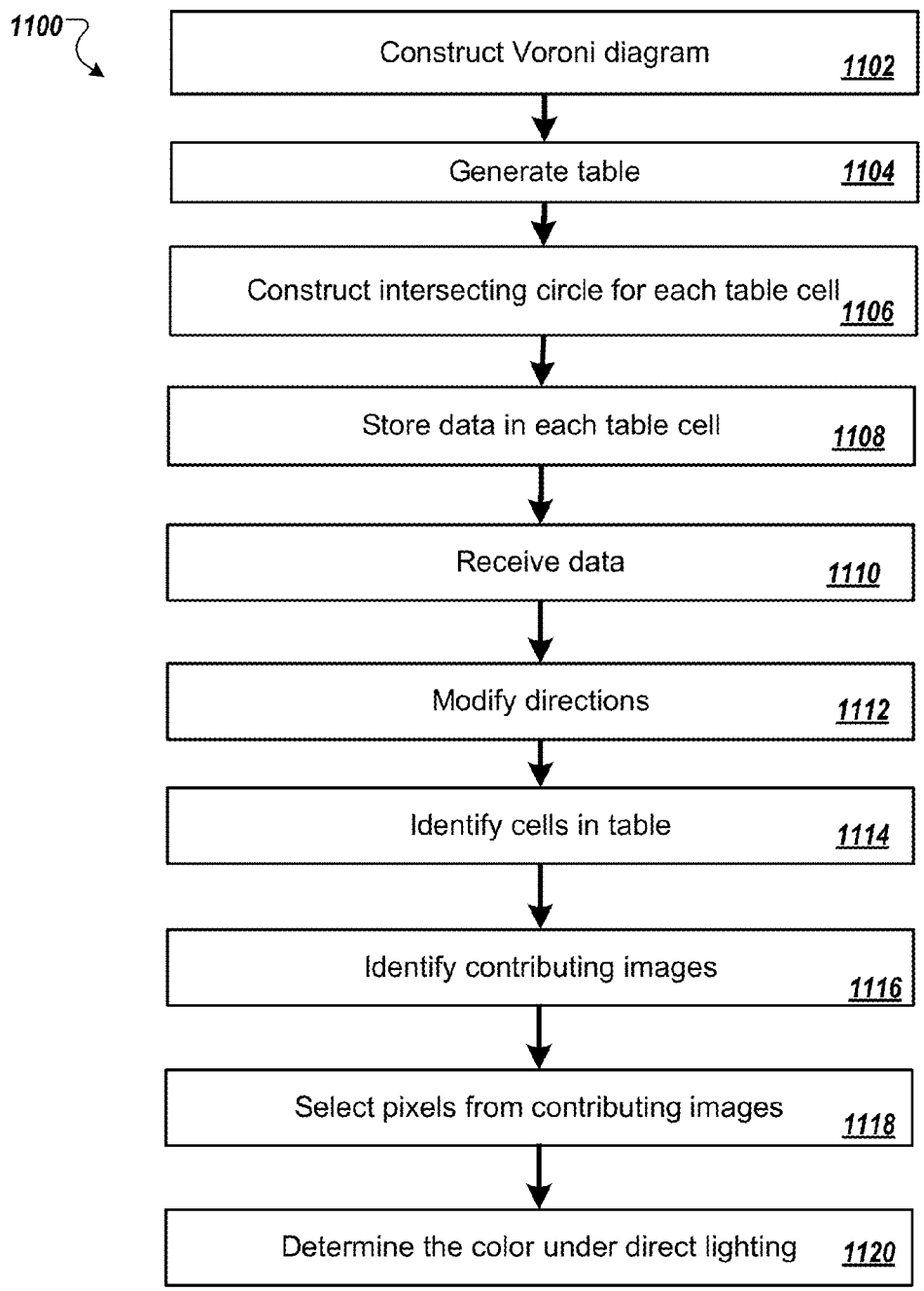
FIG. 11A is a flow diagram of an example technique for determining the effects of direct lighting at a given mapping position.

FIG. 11A is a flow diagram of an example technique 1100 for determining the effects of direct lighting at a given mapping position. For convenience, the technique 1100 will be described as being performed by a system of one or more data processing apparatus located in one or more locations. For example, a shading module, e.g., the shading module 108 of FIG. 1, appropriately programmed, can perform the technique 1100.

The system constructs 1102 a Voronoi diagram over a surface defined by the angles of the mirrors in the material sample scanner. That is, for each point in the surface, the system identifies the closest mirror, where the distance from a point to a mirror is defined by the distance from the point to the center of the mirror. All of the points that share the same closest mirror collectively form a zone in the Voronoi diagram. The surface can be, e.g., the portion of the ellipsoid defined by the positions of the mirrors as described with reference to FIGS. 2A and 2B. Alternatively, the surface can be the hemisphere defined by the angles of the mirrors.

Figure 11B:
FIG. 11B shows an example Voronoi diagram.

FIG. 11B shows an example Voronoi diagram 1150. The example Voronoi diagram 1150 was constructed over a hemisphere defined by the angles of the mirrors in a material sample scanner. The diagram 1150 includes a number of zones, e.g., zone 1152 and zone 1154, that each includes all of the points that share the same closest mirror in the set of mirrors.

Returning to the description of FIG. 11A, the system generates 1104 a table that is mapped to the surface by horizontal and vertical angle. That is, each cell in the table represents a respective area of the surface having a respective angular width and height. For example, if the table is a 1025×256 table, each cell in the table represents a respective area having a 0.35 degree width and a 0.35 degree height.

For each cell of the table, the system constructs 1106 a circle centered at the center of the area represented by the cell over the surface and identifies the intersections of the circle with the zones of the Voronoi diagram. The system constructs each circle such that the circle has the smallest possible radius that covers at least two zones in the Voronoi diagram for any direction, i.e., any line drawn through the center of circle at an arbitrary direction must cross two or more zones of the Voronoi diagram before it exits the circle.

The system stores 1108 data in each cell of the table. In particular, in each cell, the system stores one or more (position, weight) pairs. In order to identify the (position, weight) pairs for a given cell, the system randomly locates a predetermined number N of random points within the circle for the cell. For example, N may be 200, 500, 1000, or 2500. For each point, the system determines the closest mirror, and determines, for each of the mirrors, how many points have that mirror as the closest mirror for the point. The system then stores a respective (position, weight) pair for each mirror, where the position value identifies the mirror and the weight is computed by dividing the number of points that have that mirror as the closest mirror by the total number of random points N. The system then stores each of the (position, weight) pairs in the corresponding cell in the table.

The system receives 1110 data that identifies the material to be shaded, the mapping position that is to be shaded, i.e., a position in a UV mapping of the three-dimensional model of the image, the view direction for the mapping position and the light direction at the mapping position.

The system modifies 1112 the view direction and the light directions so that they map to cells of the table. For example, if the directions are provided to the system as (x,y,z) that have a range of [−1,1], the system may modify the x and y coordinates as follows: the system can add 1 to each of the x and y coordinates to change their range to [0, 2] and then divide each of the x and y coordinates by 2 to change the range to [0,1]. The system can then multiply x and y by the table width, i.e., the number of columns in the table to change the range to [0, width].

The system identifies 1114 cells in the table using the view direction and the light direction. That is, the system identifies a first cell using the view direction and a second cell using the light direction. The system can identify a cell from a set of coordinates by using the x coordinate as the column index for the cell and the y coordinate as the row index for the cell.

The system identifies 1116 contributing palletized images and a respective weight for each contributing image using the content stored in the identified cells in the table. That is, each of the identified cells stores one or more (position, weight) pairs. The system computes each possible (position1, position2) pair, where position1 is one of the positions stored in the cell identified using the view direction, and position2 is one of the positions stored in the cell identified by the light direction. For each (position1, position2) pair, the system computes a weight by multiplying the weight that is paired with position1 by the weight that is paired with position2. The system then maps each (position1, position2) pair to the palletized image identified by the (light, camera) pair having values that match the (position1, position2) pair and uses the weight for the (position1, position2) pair as the weight for the palletized image.

The system selects 1118 a pixel from each contributing palletized image. The system can select the pixels from each image using the UV coordinates received from the rendering engine, i.e., by translating the received UV coordinates to an image location and selecting the pixel at that location in each contributing image.

The system determines 1120 the color under direct lighting at the mapping position based on the weights for each contributing image. That is, the system multiplies the color of each pixel by the weight for the corresponding image and then sums the weighted colors to determine the color under direct lighting at the position.

Figure 12:
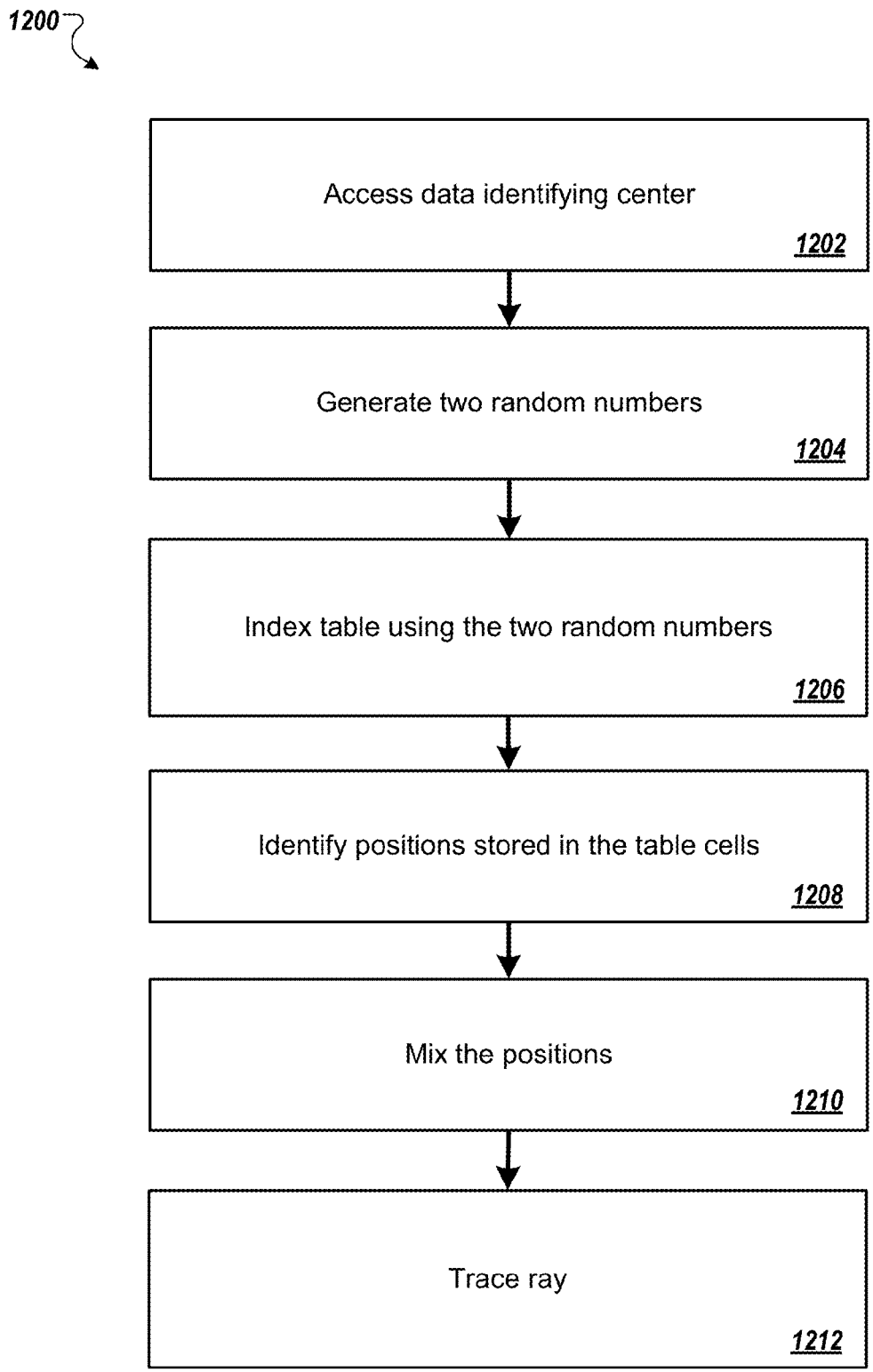
FIG. 12 is a flow diagram of an example technique for determining the effects of indirect lighting at a given mapping position.

FIG. 12 is a flow diagram of an example technique for determining the effects of indirect lighting at a given mapping position. For convenience, the technique 1200 will be described as being performed by a system of one or more data processing apparatus located in one or more locations. For example, a shading module, e.g., the shading module 108 of FIG. 1, appropriately programmed, can perform the technique 1200.

The system accesses 1202 the data identifying the center of each of the pieces of the hemisphere obtained from the material sample scanner. That is, the system accesses the K×M table that corresponds to the pixel and region image that are identified by the position in the UV mapping and the light direction specified in the request. In other words, the system identifies the region image that corresponds to the light direction specified in the request, identifies the pixel in the identified image that corresponds to the position in the UV mapping, and accesses the K×M table that corresponds to the identified pixel.

The system generates 1204 two random numbers. The random numbers are non-integer numbers, with the first number being selected from a range of zero to K and the second number being selected from a range of zero to M.

The system indexes 1206 the table using the two random numbers to identify the four table cells that bound the pair of numbers. For example, if the first number is 2.4 and the second number is 3.6, the four cells that bound the pair of numbers will be the cells having the indices [2,3], [2,4], [3,3], and [3,4].

The system identifies 1208 the positions stored in the table cells that bound the pair of numbers.

The system mixes 1210 the positions using bilinear interpolation to generate a final position and then traces 1212 a ray from the mapping position in the direction defined by the final position to determine the color for the ray. In order to determine the color for the ray, the system can send a request to the rendering engine identifying the direction of the ray and the rendering engine can return the color that results from tracing the ray in that direction.

In some implementations, the system can repeat steps 1204 through 1212 multiple times to generate multiple colors. The system can then average the colors generated by casting each ray to determine the final color at the mapping position.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   a collimated light source having a lens for emitting collimated light;
   a second mirror;
   a plurality of first planar mirrors, wherein the light source is movable to directly illuminate each first planar mirror of the plurality of first planar mirrors, and wherein, for each first planar mirror, directly illuminating the first planar mirror comprises emitting light from the lens of the light source that is reflected by the second mirror to intersect a reflective surface of the first planar mirror;
   a sample support configured to support a material sample, wherein the sample support is positioned such that each of the first planar mirrors reflects a respective view of the material sample from a different perspective;
   a camera configured to capture a plurality of images of the plurality of first planar mirrors reflecting the material sample, each of the plurality of images being captured while the light source is positioned to directly illuminate a different first planar mirror of the first planar mirrors;
   wherein the first planar mirrors are arrayed so that respective surfaces of the first planar mirrors approximate a portion of an outer surface of an ellipsoid; and
   wherein the sample support is configured to support the material such that a center of the material sample is positioned at a first focal point of an ellipse formed by taking a cross section of the ellipsoid that passes through a center of the ellipsoid and is along a semi-axis of the ellipsoid.

2. The apparatus of claim 1, wherein each image contains a plurality of regions, and wherein each region of the plurality of regions corresponds to a respective planar mirror of the plurality of first planar mirrors, and wherein each region is an image of the corresponding first mirror reflecting the respective view of the material sample.

3. The apparatus of claim 1, wherein the camera is further configured to provide the images to a system for use in generating data structures for shading a computer graphics representation of the material sample.

4. The apparatus of claim 1, wherein the sample support is further configured to allow the material sample to be rotated along one or more axes.

5. The apparatus of claim 1, wherein the light source is mounted on a rotating disc.

6. The apparatus of claim 1, wherein the sample support is configured to suspend the material sample between the plurality of first planar mirrors and the light source.

7. The apparatus of claim 6, wherein the camera is proximate to the light source.

8. The apparatus of claim 1, wherein the camera is positioned at a second focal point of the ellipse.

9. The apparatus of claim 1, wherein the camera is configured to capture the images of the mirrors in response to a request received from an external system.

\* \* \* \* \*

UNITED STATES PATENT AND TRADEMARK OFFICE
CERTIFICATE OF CORRECTION

| | |
|---|---|
| PATENT NO. | : 9,235,927 B2 |
| APPLICATION NO. | : 14/659160 |
| DATED | : January 12, 2016 |
| INVENTOR(S) | : Peter Ognyanov Mitev et al. |

It is certified that error appears in the above-identified patent and that said Letters Patent is hereby corrected as shown below:

In the listing of Item 72 Inventors, Title Page, column 1, line 3, delete "Kovatchitsa (BG)" and insert -- Kovatchitsa Village (BG) --.

Signed and Sealed this
Twenty-fourth Day of May, 2016

Michelle K. Lee
*Director of the United States Patent and Trademark Office*